Feb. 1, 1927.
W. STANLEY
FISH BAIT
Filed May 28, 1926
1,615,963
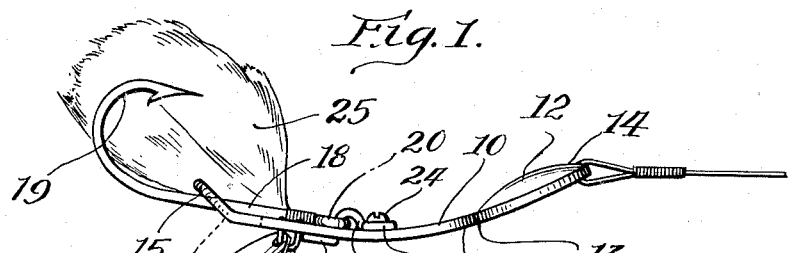
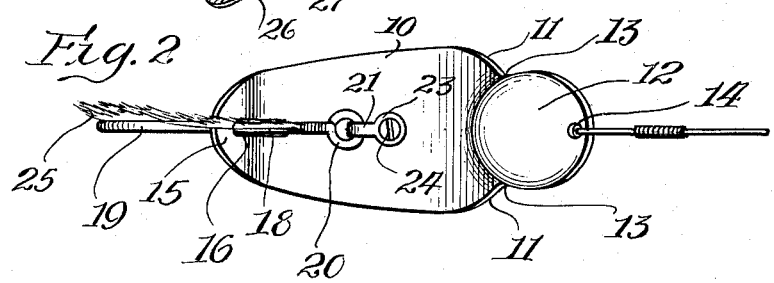
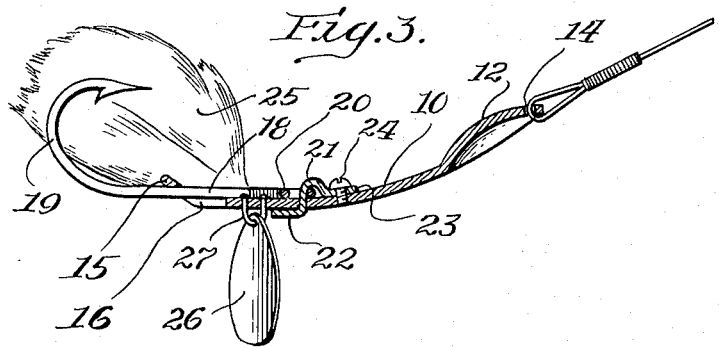
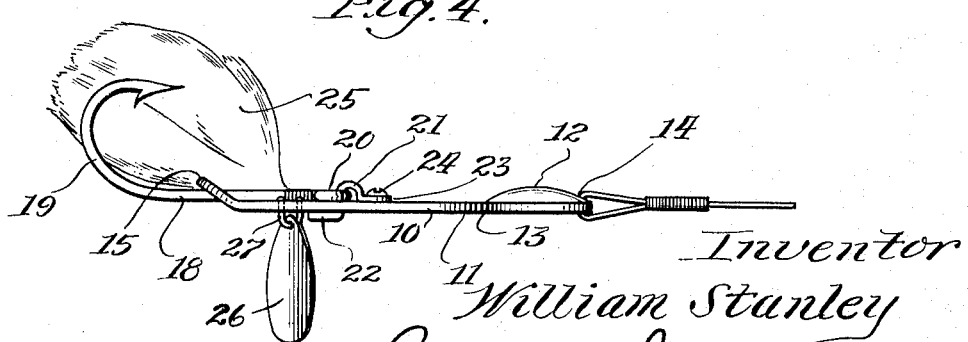
Inventor
William Stanley
by Ramirez & Ramirez Atty's.

Patented Feb. 1, 1927.

1,615,963

UNITED STATES PATENT OFFICE.

WILLIAM STANLEY, OF CHICAGO, ILLINOIS.

FISH BAIT.

Application filed May 28, 1926. Serial No. 112,191.

This invention is directed to a fish bait, preferably formed of metal, which, by reason of its configuration is designed, when retrieved, to ride upon the surface of the water and to dart from side to side in simulation of the movements of a live minnow. The invention is further directed to the means provided for securing the hook in an efficient and convenient manner, and to the provision of a body which may be easily stamped or died from sheet metal and finished in nickel or the like as is customary in the finishing of spoon or spinner baits of the character commonly in use.

Further features will appear from a detailed description of the invention in connection with the accompanying drawing wherein—

Figure 1 is a side elevation of the bait showing substantially the position assumed when the bait is being retrieved;

Fig. 2 is a top or plan view of the same;

Fig. 3 is a sectional elevation through the center of the bait; and

Fig. 4 is a side elevation of a modified form.

The bait of Figs. 1, 2 and 3 comprises a body 10 of comparatively thin material, preferably metal, which is continuously curved from front to rear, but is flat from side to side. The body is of ovate form in plan and is slightly broader at its forward end, being shouldered on each side at the points 11—11 where the body merges into the head portion 12, which is connected to the body by a neck of reduced diameter furnishing side notches 13—13 at the point of juncture, which notches afford channels for the back flow of the water on each side of the neck as the bait is being retrieved.

The head is of concavo-convex formation, being concave on its under face which causes the upper or convex side of the head to protrude upwardly above the arcuate plane of the body. The head is preferably circular in outline and is provided near its forward edge with an aperture 14 which furnishes a line tie at this point.

The rear or tail portion 15 of the body is struck upwardly at an oblique angle and is provided with an aperture 16, which aperture is longitudinally elongated and cuts through the angle of mergence of the tail portion 15 with the body. A hook has its shank 18 entered through said aperture with the barbed end 19 extending rearwardly from the body and upturned to bring its point substantially above the tail end of the body.

The eye 20 of the hook lies horizontally and is secured in position by means of a clip 21, which is in the form of a tongue hooked through the eye and through the body and having its terminal portion 22 struck rearwardly to underlie the body. The forward end of the clip is provided with an eye 23 which receives a screw 24 entered into the body near the center thereof, and this arrangement serves to firmly and rigidly anchor the hook to the body in such a way as to maintain the barbed portion of the hook in upstanding relation to the plane of the body and to the rear thereof.

The hook is preferably guarded by means of a feather 25 which stands in a vertical plane alongside the hook and serves to guard the same against fouling. At the same time, the feather, being laterally flexible, will flutter more or less as the hook darts from side to side in being retrieved, which fluttering will be occasioned by reason of the fact that the vertical plane of the feather will present itself broad side to the water when the bait as a whole tends to move laterally. The body of the hook is further provided on its under side with a small spoon 26 which is pivoted to a loop 27 secured to the body near its rear end.

Fig. 4 shows a modification in which the body of the bait is made flat or plane instead of rocker shaped as in the remaining figures, but in other respects the bait is similar to the one just described.

In use, the bait will be made of sufficient weight to cast readily, and when striking the water will, of course, tend to sink or settle toward the bottom. When, however, the bait is being retrieved, the concavo-convex formation of the head will cause the bait to rise to the surface, or close thereto, and the impingement of the under side of the head against the water will cause the latter to stream backwardly past the notched side portions constituting the neck of the bait, which will establish a condition of unstable equilibrium causing the bait to dart from side to side, which darting movements are facilitated by reason of the fact that the bait is flat or plane in a transverse direction and formed of thin material, so that it will easily slide from side to side upon or near to the surface of the water, and when riding at the surface, the upturned head will occasion a rippling by reason of its impingement against the water at the surface.

The formation of the bait is one which will tend to create a considerable disturbance of the surface water, and this in conjunction with the glitter occasioned by the lateral movements of the bait upon, or near to the surface, will tend to attract the fish. The luring effect will also be enhanced by the fluttering of the feather which will, by reason of its upstanding position, tend to resist the lateral movements of the bait, or, in other words, to impose itself broad side to the direction of such movements, and a further simulation of life will be imparted by the small spoon which hangs freely near the rear end of the bait where it will receive the vibrating effect occasioned by the body movements of the bait as a whole.

The bait, being formed of a thin sheet or plate of metal of uniform thickness, can be readily stamped or died, and will afford a firm and rigid anchorage for the hook and the line tie. By elongating the slot in the manner indicated, the feathered hook can be readily positioned in assembling by entering the hook, barbed end first, through the slot and afterward turning it to the correct position for fastening. When the forward end of the hook is secured, it will cause the shank to bear firmly against the terminal or bridged over rear end of the slot, and this, in conjunction with the flatwise contact of the eye at the forward end of the hook will maintain the parts in proper relation.

I claim:

1. A fish bait comprising a transversely plane body of uniform thickness provided at its rear end with a hook and provided at its forward end with a head, the bait at the point of juncture of the head and body being provided with a notch on each side, substantially as described.

2. A fish bait comprising a transversely plane body of uniform thickness provided at its rear end with a hook and provided at its forward end with a head, the bait at the point of juncture of the head and body being provided with a notch on each side, the head being of concavo-convex formation with its convex surface extending upwardly, substantially as described.

3. A fish bait comprising a body of uniform thickness provided at its rear end with a hook and provided at its forward end with a head, the bait at the point of juncture of the head and body being provided with a notch on each side, the head being of concavo-convex formation with its convex surface extending upwardly, and the bait as a whole being arcuately bowed from end to end thereof, substantially as described.

4. A fish bait comprising a body of uniform thickness provided at its rear end with a hook and provided at its forward end with a head, the bait at the point of juncture of the head and body being provided with a notch on each side, the head being of concavo-convex formation with its convex surface extending upwardly, and the bait as a whole being arcuately bowed from end to end thereof, and being flat in its transverse configuration, substantialy as described.

5. A bait comprising a body and head formed of a sheet of metal of uniform thickness and the head being protruded upwardly with respect to the body, a hook secured to the body extending rearwardly therefrom and having its barbed end standing upwardly, and a guard for the hook formed of thin flexible material and standing in a plane at right angles to the general plane of the body, substantially as described.

6. A fish bait consisting of a body and head formed of a plate of metal of uniform thickness, the head being of concavo-convex formation and protruding above the body, notches being formed in the edges of the bait at the point of juncture of the head and body, the body being plane in a transverse direction, and a hook secured to the body and extending rearwardly thereof, substantially as described.

7. A fish bait consisting of a body and head formed of a plate of metal of uniform thickness, the head being of concavo-convex formation and protruding above the body, notches being formed in the edges of the bait at the point of juncture of the head and body, the body being plane in a transverse direction and being bowed in a longitudinal direction, and a hook secured to the body and extending rearwardly thereof, substantially as described.

8. A fish bait consisting of a body and head formed of a plate of metal of uniform thickness, the head being of concavo-convex formation and protruding above the body, notches being formed in the edges of the bait at the point of juncture of the head and body, the body being plane in a transverse direction, a hook secured to the body and extending rearwardly thereof, and a guard of thin flexible material secured in adjacent relation to the hook and standing in a plane at right angles to the transverse plane of the body, substantially as described.

9. A fish bait consisting of a body and head formed of a plate of metal of uniform thickness, the head being of concavo-convex formation and protruding above the body, notches being formed in the edges of the bait at the point of juncture of the head and body, the body being plane in a transverse direction and being bowed in a longitudinal direction, a hook secured to the body and extending rearwardly thereof, and a guard of thin flexible material secured in adjacent relation to the hook and standing in a plane at right angles to the transverse plane of the body, substantially as described.

WILLIAM STANLEY.